United States Patent [19]

Johnson

[11] Patent Number: 5,203,616
[45] Date of Patent: Apr. 20, 1993

[54] ELECTROHYDRAULIC PARKING BRAKE CONTROL SYSTEM

[75] Inventor: Douglas R. Johnson, Waterloo, Iowa

[73] Assignee: Deere & Company, Moline, Ill.

[21] Appl. No.: 822,766

[22] Filed: Jan. 21, 1992

[51] Int. Cl.⁵ .................... B60T 13/16; F16D 65/24
[52] U.S. Cl. ............................... 303/10; 303/15;
 188/170; 192/0.094; 192/1.23; 192/1.41; 192/4 R
[58] Field of Search .............. 303/3, 10, 14–16, 303/11, 63, 92, 101, DIG. 2; 188/151 A, 182, 170; 192/0.049, 0.094, 1.21, 1.23, 1.36, 1.4, 1.41, 4 R, 13 A

[56] References Cited
U.S. PATENT DOCUMENTS

| | | | |
|---|---|---|---|
| 3,763,975 | 10/1973 | Fontaine | 192/1.23 |
| 3,977,732 | 8/1976 | Grosseau | 303/6.01 |
| 3,999,075 | 12/1976 | Johnson et al. | 303/63 |
| 4,195,716 | 4/1980 | Wirt | 192/1.36 |
| 4,245,724 | 1/1981 | Beck | 188/170 |
| 4,254,845 | 3/1981 | Braun | 180/244 X |
| 4,432,585 | 2/1984 | Nezuka | 303/10 |
| 4,749,236 | 6/1988 | Graham | 303/10 X |
| 4,856,622 | 8/1989 | Sartain et al. | 188/170 |
| 4,923,254 | 5/1990 | Vander Molen et al. | 303/10 X |
| 4,989,703 | 2/1991 | Forsyth et al. | 188/151 A X |

Primary Examiner—Robert J. Oberleitner
Assistant Examiner—Josie A. Ballato

[57] ABSTRACT

A spring-applied, pressure-released parking brake is controlled by an electrohydraulic control system. A solenoid operated parking brake control valve and a manually operated tow control valve control communication between the engine driven pump, the sump, the operator driven pump and the release chamber of the parking brake so that the parking brake can be released and applied during normal operation of the engine driven pump and so that the parking brake can be released by operation of the operator driven pump when the vehicle is shut down. A transport sump valve and an inlet check valve operate to prevent the parking brake from engaging while the vehicle is moving too fast, as a result of operator error, hydraulic failure or electrical failure.

13 Claims, 1 Drawing Sheet

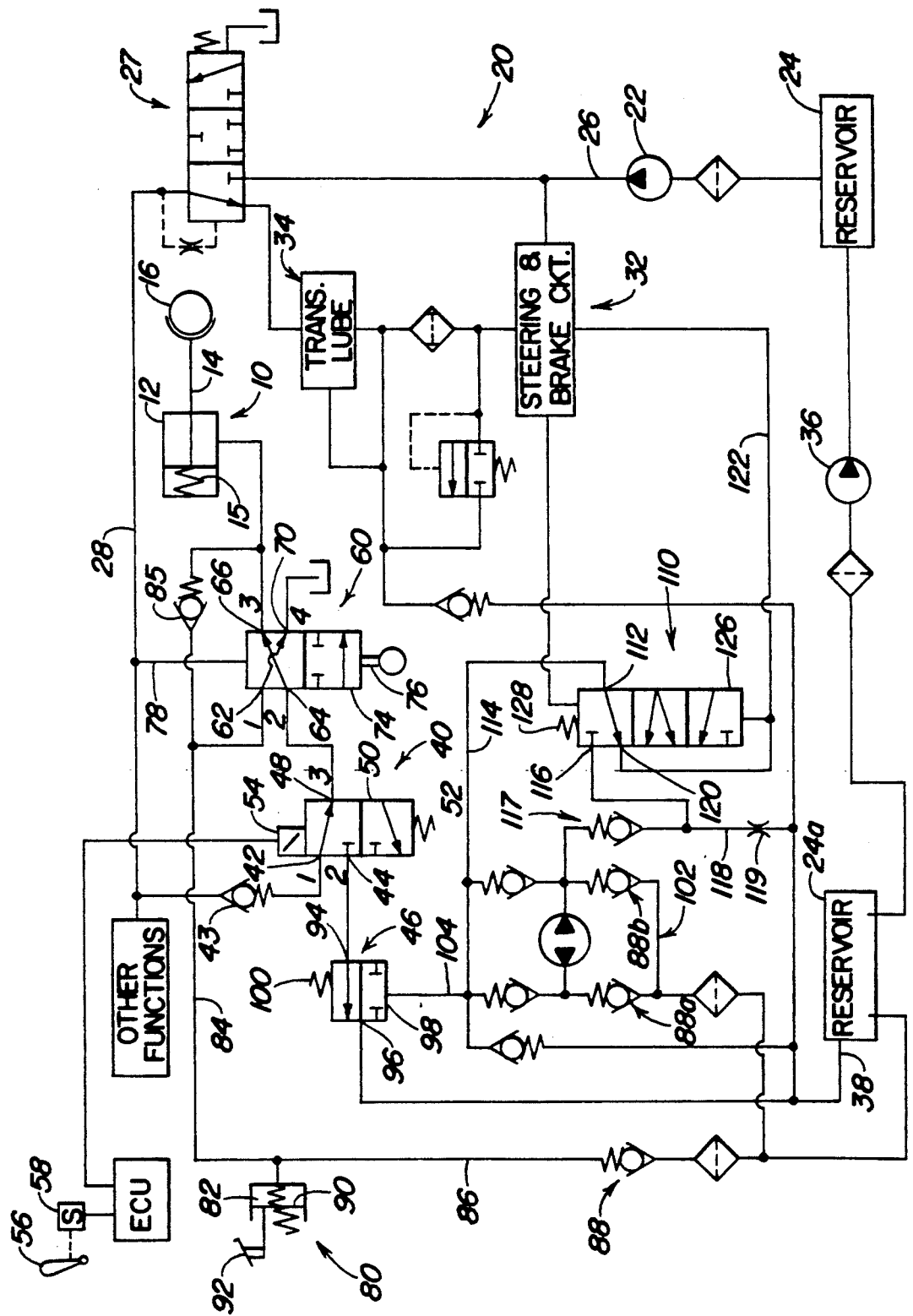

ELECTROHYDRAULIC PARKING BRAKE CONTROL SYSTEM

BACKGROUND OF THE INVENTION

The present invention relates to a control system for controlling the operation of a vehicle parking brake, and more specifically, an electrohydraulic control system for controlling the operation of a spring-applied, pressure-released parking brake.

It is known to provide a vehicle with a spring-applied, pressure-released parking brake that is separate from the service brakes. Such a parking brake can be engaged with a drive train component to prevent movement of the vehicle without having to shut down the engine, and such a parking brake will automatically disengage upon engine shutdown. However, in the event of an engine failure or other mechanical failure, there must be some provision for releasing the parking brakes so that the vehicle may be pushed or towed to a place where repairs may be made.

For example, U.S. Pat. No. 3,999,075 issued to P. R. Johnson et al. on Dec. 21, 1976, discloses a brake control system that includes combined air and hydraulic circuitry. The parking brakes are normally released by pressurized fluid from an engine driven pump. When the hydraulic pressure drops below a predetermined level, pneumatic pressure from an accumulator allows normal brake operation. In the event of a mechanical failure, a parking brake valve communicates air pressure from the accumulator to a master cylinder, which, in turn, supplies pressurized hydraulic fluid to release the brakes. However, this system requires extensive hydraulic and pneumatic circuitry.

An entirely mechanical parking brake spring override mechanism is disclosed in U.S. Pat. No. 4,245,724, issued to H. E. Beck on Jan. 20, 1981. This mechanism includes a bolt or a plurality of bolts which may be inserted through an opening in the outer housing of the brake to engage a threaded aperture in a member that is attached to the brake piston. Rotation of the bolt draws the piston away from its engaged position, against the bias of the spring, and releases the braked members. However, this system requires access to the parking brake in order to release it. This is inconvenient because the parking brake is often located in an area that is not easily accessible. Also, special tools are required to install and remove the bolts, and such tools may not be available at the location of a failure.

Some production row crop tractors have a parking brake which includes a park pawl which is coupled to a shift lever on the tractor control console. When the shift lever is in the park position, teeth on the park pawl engage a reduction gear in the transmission in the park position, thereby locking the drive train and preventing vehicle movement. However, such a parking brake system requires a mechanical linkage between the shift lever and the park pawl. With the advent of electronically controlled transmissions, it would be desirable to provide a parking brake function which does not require mechanical linkages. For example, if electronic shift controls are mounted on an armrest of a pivoting vehicle seat, then it would be impractical to connect mechanical linkages to such a pivoting platform.

SUMMARY OF THE INVENTION

An object of the present invention is to provide a parking brake system which is suitable for use with an electronically controlled transmission.

Another object of the present invention is to provide such a parking brake system which includes provision for releasing the parking brakes so that the vehicle may be pushed or towed in the event of a mechanical failure.

Another object is to provide such a parking brake system which does not require a mechanical linkage coupled to a shift lever.

Another object is to provide such a parking brake system which can be operated without the exertion of large manual forces.

Another object is to provide a parking brake system which automatically engages when the engine is turned off and the vehicle is at rest.

Another object is to provide a means of preventing the parking brake from engaging inadvertently at high vehicle speeds as a result of power failure or operator error.

These and other objects are achieved by the present invention wherein a spring-applied, pressure-released parking brake is controlled by an electrohydraulic control system. A solenoid operated parking brake control valve, a hydraulically controlled transport sump valve and a manually operated tow control valve cooperate to control communication between a release chamber of the parking brake, an engine driven pump, a sump and a manually operated pump. The solenoid of the parking brake control valve is preferably controlled in response to operation of a shift lever in the vehicle operator's compartment. Normally, the solenoid is energized and the valves cooperate to communicate pressure from the engine driven pump to the release chamber to release the parking brake. When the shift lever is placed in a park position the solenoid is de-energized and the parking brake control valve communicates the release chamber with the sump. Also, when the vehicle is shut down, the solenoid is de-energized, pressure from the engine driven pump is lost and the parking brake is applied by its spring. In this situation the manually operated tow control valve may be actuated to block communication between the release chamber and the sump so that the release chamber may be pressurized by the manually operated pump. Preferably, the manually operated pump is operatively coupled to the vehicle clutch pedal. First and second check valves permit one way fluid flow from the sump to the operator driven pump and from the manually operated pump to the release chamber.

BRIEF DESCRIPTION OF THE DRAWINGS

The sole FIGURE is a schematic diagram of an electrohydraulic control system for controlling the operation of a spring-applied, pressure-released parking brake.

DETAILED DESCRIPTION

Referring to the FIGURE, a spring-applied, pressure-released parking brake 10 includes a release chamber 12 which controls an actuator 14 which is engagable by spring 15 with the output shaft 16 of the vehicle transmission (not shown). An electrohydraulic parking brake control system 20 controls operation of the parking brake 10 by controlling the pressurization of the release chamber 12.

The control system 20 includes an engine driven pump 22 which supplies pressurized fluid from a reservoir or sump 24 to line 26, to the vehicle steering and brake circuit 32, to the lube circuit 34, to pressure regulating valve 27 and to line 28. A scavenger pump 36 transfers fluid collected from various hydraulic functions in sump line 38 and sump 24a to the sump 24. Thus, system pressure is communicated from pump 22 to line 28 and pressure regulating valve 27 with branches to the steering and brake circuit 32 and the lube circuit 34.

A parking brake control valve 40 includes a housing having an inlet 42 connected to line 28 via check valve 43, a port 44 connected (when the vehicle is stopped) to the sump line 38 via transport sump valve 46 and a port 48. Parking brake control valve 40 also includes a parking brake valve member 50 movable between a first position wherein the inlet 42 is communicated with the port 48 and the port 44 is blocked, and a second position wherein inlet 42 is blocked and port 44 is communicated with port 48. An energized solenoid 54 holds the valve member 50 in its first position. A spring 52 is biassed to move valve member 50 to its second position when solenoid 54 is de-energized. The solenoid 54 is operatively connected to a transmission shift lever 56 so that the solenoid 54 will be energized when the shift lever 56 is not a "park" position.

For example, if this invention were to be used in connection with a transmission (not shown) controlled by a microprocessor-based electronic control unit (ECU), then a switch 58 or a transducer would sense when the shift lever 56 was not in its park position and provide an appropriate signal to the ECU, which in turn would energize the parking brake valve solenoid 54 via a convention valve driver circuit (not shown).

A tow valve 60 includes a tow valve housing having a first inlet 62, a second inlet 64 connected to port 48 of the parking brake control valve 40, a first outlet 66 connected to the release chamber 12 and a second outlet 70 connected to reservoir pressure. Tow valve 60 also includes a tow valve member 74 movable between a first position wherein the first inlet 62 is communicated with the second outlet 70 and the second inlet 64 is communicated with the first outlet 66, and a second position wherein the first inlet 62 and the first outlet 66 are blocked and the second inlet 64 is connected to the second outlet 70. A member 76 is manually operable to move the tow valve member 74 to either its first or its second position. A pilot line 78 communicates pressurized fluid from line 28 and acts to urge the valve member 74 toward its first position.

An manually operated pump 80 includes a variable volume chamber 82 which is communicated with the first inlet 62 of the tow valve 60 via line 84 and with release chamber 12 via check valve 85, and which is communicated with the sump 24a via line 86 and check valve 88. Pump 80 also includes a piston 90 which is operatively coupled to a manually operable actuator 92, such as a foot operated vehicle clutch pedal.

The control system 20 also includes the transport sump valve 46 which includes a housing having a port 94 connected to port 44 of valve 40 and an outlet 96 connected to sump line 38. Valve 46 also includes a valve member 98 movable between a first position wherein inlet 94 is communicated with the outlet 96, and a second position wherein inlet 94 and outlet 96 are blocked. The valve member 98 is normally urged toward its first position by spring 100.

A conventional ground-driven pump/check valve assembly 102 receives fluid from reservoir 24a via check valve 88a or 88b and supplies fluid to pilot line 104 which acts on the valve member 98 to urge valve member 98 to its second position.

The manually operated pump 80 and the ground driven pump 102 draw their oil from a lower level in reservoir 24a than does scavenger pump 36. This assures that the scavenger pump 36 will not draw reservoir 24a dry and prevents the ground driven pump 102 and manually operated pump 80 from operating.

An emergency pump valve 110 includes a housing having an inlet 112 which receives fluid from pump 102 via line 114, a port 116 connected to pump assembly 102 via check valve 117 and to sump line 38 via line 118 and orifice 119, and a port 120 connected to steering and brake circuit 32 via pilot line 122. Valve 110 also includes a valve member 126 movable between a first position wherein the inlet 112 is communicated with the port 120 and port 116 is blocked, a second position wherein inlet 112 is communicated with ports 116 and 120, and a third position wherein inlet 112 is communicated with port 116 and port 120 is blocked. The valve member 126 is urged toward its a first position by spring 128. The pilot line 122 communicates pressure from steering and brake circuit 32 to the valve member 126 and this pressure urges the valve member 126 toward its second and third positions.

In the emergency steering mode (the first position of valve 110), the oil flow from the ground driven pump 102 goes to the steering circuit 32 and returns to reservoir 24a through the transmission lube circuit, thereby providing a closed loop in the circuit so that reservoir 24a will not be pumped dry by the ground driven pump 102.

MODE OF OPERATION

With the control system 20 in the condition illustrated in FIG. 1, the solenoid 54 is energized, check valve 43 and valves 40 and 60 communicate pressurized fluid from pump 22 to the release chamber 12 and the parking brake 10 is released. However, if the vehicle (not shown) is shut down and not moving, then the solenoid 54 will be de-energized, valve 40 will move to its second position, the pressure will be released from chamber 12 and the parking brake 10 will be applied. This will be the case even if the operator forgets or ignores putting the shift lever 56 in its park position.

If the shift lever 56 is moved to its park position and the vehicle is stopped or below a predetermined speed, then switch 56 will de-energize solenoid 54 and spring 52 moves valve 40 to its second position thereby connecting release chamber 12 to sump line 38 via valves 60, 40 and 46, and allowing spring 15 to engage the parking brake 10. Thus, the only effort required to engage the parking brake 12 is the small effort required to move shift lever 58 to its park position.

Inlet check valve 43 insures that the release chamber 12 will not be sumped through valves 60, 40 and line 28 in the event of a failure in pump 22.

The transport sump valve 46 will prevent the park brake from engaging if the vehicle is moving. The ground driven pump 102 will provide a flow of oil to line 114 whenever the vehicle is moving. The rate of flow is dependent of the speed at which the vehicle is moving. In normal operation, that oil goes through ports 112 and 120 of valve 110, the oil is then recirculated to the ground driven pump through check valve 117 and to the sump line 38 through orifice 119. The orifice 119 and check valve 117 produce pressure in lines 114 and 104. That pressure urges valve member 46 to position 2 where ports 94 and 96 are blocked thereby preventing oil flow from the release chamber 12 through valves 60 and 40 to the sump line 38. The size of orifice 119 and pump 102 determine the maximum speed at which the park brake can be engaged.

If it is desired to release the parking brake 12 while the engine driven pump 22 is not operating (such as when towing the vehicle), this can be accomplished by manually moving tow valve 60 to its second position. This disconnects the sump 24 from release chamber 12 and communicates release chamber 12 with the manually operated pump 80. Actuation of pedal 92 moves the piston 90 and transfers fluid from sump 24a to the release chamber 12 via check valve 88, lines 86 and 84 and check valve 68. The parking brake 12 can be re-applied in this situation merely by manually moving valve 60 back to its first position. This disconnects pump 80 from chamber 12 and communicates chamber 12 to the sump via valves 60, 40 and 46. If the operator fails to reapply the parking brake 12 by manually moving valve 60 back to its first position, the parking brake 12 will be automatically applied when the engine is started by oil pressure from pump 22 through line 26, 28, 78 and valve 27 moving valve 60 back to its first position thereby sumping oil in the release chamber through valves 60, 40 and 46 to sump line 38.

While the invention has been described in conjunction with a specific embodiment, it is to be understood that many alternatives, modifications, and variations will be apparent to those skilled in the art in light of the foregoing description. Accordingly, this invention is intended to embrace all such alternatives, modifications, and variations which fall within the spirit and scope of the appending claims.

I claim:

1. In a brake system having a spring-applied, pressure-released parking brake having a release chamber, a control system for controlling operation of the parking brake, the control system comprising:
   an engine driven pump for supplying pressurized fluid;
   a sump;
   an operator driven pump for supplying pressurized fluid in response to manual operation thereof; and
   valve means for controlling communication between the engine driven pump, the sump, the operator driven pump and the release chamber so that the parking brake can be released and applied during normal operation of the engine driven pump and so that the parking brake can be released by operation of the operator driven pump when the engine driven pump is not operating;
   the valve means comprising:
   a parking brake control valve for normally communicating fluid from the engine driven pump to the release chamber and for communicating the release chamber with the sump in response to an operator produced signal;
   a tow control valve for selectively permitting and preventing the operator driven pump supplying pressurized fluid to the release chamber, and for controlling communication between the release chamber and the engine driven pump; and
   a transport valve for preventing engagement of the parking brake when the vehicle is in motion.

2. The invention of claim 1, further comprising:
   a first check valve permitting one way fluid flow from the operator driven pump to the release chamber; and
   a second check valve permitting one way fluid flow from the sump to the operator driven pump.

3. In a brake system having a spring-applied, pressure-released parking brake having a release chamber, a control system for controlling operation of the parking brake, the control system comprising:
   an engine driven pump for supplying pressurized fluid;
   a ground driven pump supplying fluid pressure to an outlet when the vehicle is in motion;
   a sump;
   an operator driven pump for supplying pressurized fluid in response to manual operation thereof; and
   valve means for controlling communication between the engine driven pump, the sump, the operator driven pump and the release chamber so that the parking brake can be released and applied during normal operation of the engine driven pump and so that the parking brake can be released by operation of the operator driven pump when the engine driven pump is not operating;
   the valve means comprising:
   a parking brake control valve for normally communicating fluid from the engine driven pump to the release chamber and for communicating the release chamber with the sump in response to an operator produced signal;
   a tow control valve for selectively permitting and preventing the operator driven pump supplying pressurized fluid to the release chamber, and for controlling communication between the release chamber and the engine driven pump; and
   a transport valve responsive to fluid pressure generated by the ground driven pump for preventing communication between the release chamber and the sump and preventing engagement of the parking brake when the vehicle is in motion.

4. In a brake system having a spring-applied, pressure-released parking brake having a release chamber, a control system for controlling operation of the parking brake, the control system comprising:
   an engine driven pump for supplying pressurized fluid;
   a sump;
   an operator driven pump for supplying pressurized fluid in response to manual operation thereof; and
   valve means for controlling communication between the engine driven pump, the sump, the operator driven pump and the release chamber so that the parking brake can be released and applied during normal operation of the engine driven pump and so that the parking brake can be released by operation of the operator driven pump when the engine driven pump is not operating, the valve means comprising a tow valve and a parking brake valve;
   the tow valve comprising a tow valve housing having a first port connected to the operator driven pump, a second port, a third port connected to a release chamber of the parking brake and a fourth port connected to the sump, a tow valve member movable between a first position wherein the first port is communicated with the fourth port and the second port is communicated with the third port, and a second position wherein the first and third ports are blocked and the second port is communicated with the third port, and a manually operable member for moving the tow valve member to its first and second positions; and the parking brake valve comprising a parking brake valve housing having a first port connected to the engine driven pump, a second port connected to the sump and a third port connected to the second port of the tow valve, a parking brake valve member movable between a first position wherein the first port is communicated with the third port and the second port is blocked, and a second position wherein the first port is blocked and the second port is communicated with the third port, a solenoid energizable to hold the parking brake valve member in its first position, and resilient means biased to urge the parking brake valve member to its second position.

5. The invention of claim 4, wherein:
the operator driven pump includes an piston member operatively coupled to a vehicle clutch pedal.

6. The invention of claim 5, further comprising:
a first check valve permitting one way fluid flow from the operator driven pump to the release chamber; and
a second check valve permitting one way fluid flow from the sump to the operator driven pump.

7. In a brake system having a spring-applied pressure-released parking brake having a release chamber, an engine driven pump for supplying pressurized fluid, a reservoir, valve means for controlling communication between the release chamber, the pump and the reservoir and manually operable means for releasing the parking brake when the engine driven pump is inoperable, characterized by:

an operator driven pump for supplying pressurized fluid in response to manual operation thereof;

a tow valve for allowing communication of pressurized fluid from the operator driven pump to the release chamber so that the parking brake can be released by operation of the operator driven pump when the engine driven pump is not operating;

a parking brake control valve for normally communicating fluid from the engine driven pump to the release chamber and for communicating the release chamber with the sump in response to an operator produced signal;

the tow control valve selectively permitting and preventing the operator driven pump supplying pressurized fluid to the release chamber, and controlling communication between the release chamber and the engine driven pump; and a transport valve for preventing engagement of the parking brake when the vehicle is in motion.

8. The invention of claim 7, wherein:
the operator driven pump includes a piston member operatively coupled to a vehicle clutch pedal.

9. The invention of claim 7, further comprising:
a first check valve permitting one way fluid flow from the operator driven pump to the release chamber; and
a second check valve permitting one way fluid flow from the sump to the operator driven pump.

10. In a brake system having a spring-applied, pressure-released parking brake having a release chamber, an engine driven pump for supplying pressurized fluid, a reservoir, valve means for controlling communication between the release chamber, the pump and the reservoir and manually operable means for releasing the parking brake when the engine driven pump is inoperable, characterized by:

an operator driven pump for supplying pressurized fluid in response to manual operation thereof;

a tow valve for allowing communication of pressurized fluid from the operator driven pump to the release chamber so that the parking brake can be released by operation of the operator driven pump when the engine driven pump is not operating;

a parking brake control valve for normally communicating fluid from the engine driven pump to the release chamber and for communicating the release chamber with the sump in response to an operator produced signal;

the tow control valve selectively permitting and preventing the operator driven pump supplying pressurized fluid to the release chamber, and controlling communication between the release chamber and the engine driven pump;

a ground driven pump supplying fluid pressure to an outlet when the vehicle is in motion; and a transport valve responsive to fluid pressure generated by the ground driven pump for preventing communication between the release chamber and the sump and preventing engagement of the parking brake when the vehicle is in motion.

11. In a brake system having a spring-applied, pressure-released parking brake having a release chamber, an engine driven pump for supplying pressurized fluid, a reservoir, valve means for controlling communication between the release chamber, the pump and the reservoir and manually operable means for releasing the parking brake when the engine driven pump is inoperable, characterized by:

an operator driven pump for supplying pressurized fluid in response to manual operation thereof; and a tow valve for allowing communication of pressurized fluid from the operator driven pump to the release chamber so that the parking brake can be released by operation of the operator driven pump when the engine driven pump is not operating, the tow valve comprising:

a tow valve housing having a first port connected to the operator driven pump, a second port, a third port connected to a release chamber of the parking brake and a fourth port connected to the sump;

a tow valve member movable between a first position wherein the first port is communicated with the fourth port and the second port is communicated with the third port, and a second position wherein the first and third ports are blocked and the second port is communicated with the third ports; and a manually operable member for moving the tow valve member to its first and second positions; and the parking brake valve comprising:

a parking brake valve housing having a first port connected to the engine driven pump, a second port connected to the sump and a third port connected to the second port of the tow valve;

a parking brake valve member movable between a first position wherein the first port is communicated with the third port and the second port is blocked, and a second position wherein the first port is blocked and the second port is communicated with the third port;

a solenoid energizable to hold the parking brake valve member in its first position; and resilient means biased to urge the parking brake valve member to its second position.

12. The invention of claim 11, wherein:
the operator driven pump includes an piston member operatively coupled to a vehicle clutch pedal.

13. The invention of claim 11, further comprising:
a first check valve permitting one way fluid flow from the operator driven pump to the release chamber; and a second check valve permitting one way fluid flow from the sump to the operator driven pump.

* * * * *